United States Patent
Dickins et al.

(10) Patent No.: US 9,571,425 B2
(45) Date of Patent: Feb. 14, 2017

(54) METHOD AND APPARATUS FOR VOICE COMMUNICATION BASED ON VOICE ACTIVITY DETECTION

(71) Applicant: DOLBY LABORATORIES LICENSING CORPORATION, San Francisco, CA (US)

(72) Inventors: Glenn N. Dickins, Como (AU); Xuejing Sun, Beijing (CN); Brendon Costa, Coniston (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 74 days.

(21) Appl. No.: 14/384,327

(22) PCT Filed: Mar. 21, 2013

(86) PCT No.: PCT/US2013/033332
§ 371 (c)(1),
(2) Date: Sep. 10, 2014

(87) PCT Pub. No.: WO2013/142705
PCT Pub. Date: Sep. 26, 2013

(65) Prior Publication Data
US 2015/0030017 A1    Jan. 29, 2015

Related U.S. Application Data

(60) Provisional application No. 61/619,198, filed on Apr. 2, 2012.

(30) Foreign Application Priority Data

Mar. 23, 2012 (CN) .......................... 2012 1 0080132

(51) Int. Cl.
*H04L 12/66*    (2006.01)
*H04L 12/861*   (2013.01)
(Continued)

(52) U.S. Cl.
CPC ............. *H04L 49/90* (2013.01); *G10L 19/167* (2013.01); *G10L 25/78* (2013.01); *H04L 65/1066* (2013.01); *H04M 3/569* (2013.01)

(58) Field of Classification Search
CPC .... H04L 49/90; H04L 65/1066; G10L 19/167; G10L 25/78; H04M 3/569
See application file for complete search history.

(56) References Cited

U.S. PATENT DOCUMENTS 7,397,478 B2   7/2008  Jiang
7,529,276 B1   5/2009  Ramakrishnan
(Continued)

FOREIGN PATENT DOCUMENTS

WO   2006/073877   7/2006
WO   2008/147272   12/2008

OTHER PUBLICATIONS

Beritelli, F. et al, "Performance Evaluation and Comparison of G.729/AMR/Fuzzy Voice Activity Detectors," IEEE Signal Processing Letters, vol. 9, No. 3, pp. 85-88, Mar. 2002.
(Continued)

*Primary Examiner* — Abdelnabi O Musa
(74) *Attorney, Agent, or Firm* — Charles L. Hamilton; Fountainhead Law Group, P.C.

(57) ABSTRACT

Voice communication method and apparatus and method and apparatus for operating jitter buffer are described. Audio blocks are acquired in sequence. Each of the audio blocks includes one or more audio frames. Voice activity detection is performed on the audio blocks. In response to deciding voice onset for a present one of the audio blocks, a subsequence of the sequence of the acquired audio blocks is retrieved. The subsequence precedes the present audio block immediately. The subsequence has a predetermined length and non-voice is decided for each audio block in the subsequence. The present audio block and the audio blocks (Continued)

in the subsequence are transmitted to a receiving party. The audio blocks in the subsequence are identified as reprocessed audio blocks. In response to deciding non-voice for the present audio block, the present audio block is cached.

18 Claims, 9 Drawing Sheets

(51) Int. Cl.
  *H04M 3/56* (2006.01)
  *G10L 25/78* (2013.01)
  *G10L 19/16* (2013.01)
  *H04L 29/06* (2006.01)

(56) References Cited

U.S. PATENT DOCUMENTS

| | | | |
|---|---|---|---|
| 7,746,847 B2 | 6/2010 | Chitturi | |
| 7,756,387 B2 | 7/2010 | Jung | |
| 7,877,514 B2 | 1/2011 | Shao | |
| 8,069,260 B2 | 11/2011 | Speicher | |
| 2003/0115320 A1 | 6/2003 | Yarroll | |
| 2003/0135370 A1* | 7/2003 | Zinser, Jr. | ............... G10L 19/00 704/249 |
| 2007/0274297 A1* | 11/2007 | Cross, Jr. | ................ G10L 15/22 370/356 |
| 2007/0291667 A1 | 12/2007 | Huber | |
| 2008/0288247 A1* | 11/2008 | Young | ..................... G10L 25/78 704/214 |
| 2009/0010453 A1* | 1/2009 | Zurek | ................. G10L 21/0208 381/94.5 |
| 2009/0043577 A1* | 2/2009 | Godavarti | ............... G10L 21/02 704/233 |
| 2009/0125304 A1* | 5/2009 | Cho | ........................ G10L 25/78 704/233 |
| 2011/0202562 A1 | 8/2011 | Bloch | |
| 2013/0077538 A1* | 3/2013 | Plotnikov | ........... H04L 12/1822 370/260 |

OTHER PUBLICATIONS

Ramirez, J. et al, "Robust Speech Recognition and Understanding, InTech," I-Tech Education and Publishing, 460 pages, Jun. 1, 2007.
Yang S. et al, "Multipoint Communications with Speech Mixing Over IP Network," Computer Communications, Elsevier Science PublishersBV, Amsterdam, NL, vol. 25, No. 1, pp. 46-55, Jan. 1, 2002.

* cited by examiner

METHOD AND APPARATUS FOR VOICE COMMUNICATION BASED ON VOICE ACTIVITY DETECTION

CROSS-REFERENCE TO RELATED APPLICATIONS

This application claims priority to Chinese Patent Application No. 201210080132.0, filed 23 Mar. 2012 and U.S. Patent Provisional Application No. 61/619,198, filed 2 Apr. 2012, each of which is hereby incorporated by reference in its entirety.

TECHNICAL FIELD

The present invention relates generally to voice communication. More specifically, embodiments of the present invention relate to transmission of audio data based on voice activity detection (VAD) and jitter buffer management in voice communication.

BACKGROUND

VAD is a technique used in voice processing in which the presence or absence of human voice is decided. VAD may be employed in voice communication applications to deactivate some processes during non-voice section of an audio session. For example, VAD can avoid unnecessary coding/transmission of silence packets in Voice over Internet Protocol applications, saving on computation and on network bandwidth. VAD is an integral part of different voice communication systems such as audio conferencing, echo cancellation, speech recognition, speech encoding, and hands-free telephony.

In a typical networking environment, there is some uncertainty about the occurrence and timing of received packets when being sent from one end point to another. For applications where the data being transmitted is mediated or not in real time, this can be overcome by using techniques that monitor transmission and correct through retransmitting data and/or providing suitable delays in the transmission to overcome any network impairment. For applications where various parties are interacting with each other in real time, such as in voice communication, this approach is not feasible as the delay in communications may represent a significant degradation in utility and perceived quality.

A conventional approach to this problem is to introduce a queue or jitter buffer that is sufficient to provide resilience to some level of network jitter, without necessarily ensuring that all data packets for the voice stream arrive. In some approaches, the length of such a jitter buffer is set to provide resilience to a certain degree by using statistical or historical information to provide a buffer and delay that permits a certain percentage of packets to be received in time for processing, forwarding or decoding and use.

Such jitter buffers introduce a necessary latency into the overall communications path. Many approaches have been proposed to manage this balance and trade off of quality and latency, and also, to improve encoding, decoding or processing to reduce the impact of missing data packets on the output voice stream.

SUMMARY

Audio blocks are acquired in sequence. Each of the audio blocks includes one or more audio frames. Voice activity detection is performed on the audio blocks. In response to deciding voice onset for a present one of the audio blocks, a subsequence of the sequence of the acquired audio blocks is retrieved. The subsequence precedes the present audio block immediately. The subsequence has a predetermined length and non-voice is decided for each audio block in the subsequence. The present audio block and the audio blocks in the subsequence are transmitted to a receiving party. The audio blocks in the subsequence are identified as reprocessed audio blocks. In response to deciding non-voice for the present audio block, the present audio block is cached.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF DRAWINGS

The present invention is illustrated by way of example, and not by way of limitation, in the figures of the accompanying drawings and in which like reference numerals refer to similar elements and in which.

DETAILED DESCRIPTION

Figure 1A:
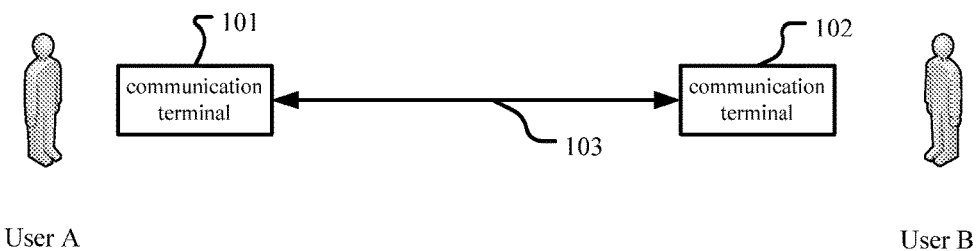
FIG. 1A is a diagram schematically illustrating an example voice communication system where embodiments of the invention can be applied.

The embodiments of the present invention are below described by referring to the drawings. It is to be noted that, for purpose of clarity, representations and descriptions about those components and processes known by those skilled in the art but not necessary to understand the present invention are omitted in the drawings and the description.

As will be appreciated by one skilled in the art, aspects of the present invention may be embodied as a system, a device (e.g., a cellular telephone, portable media player, personal computer, television set-top box, or digital video recorder, or any media player), a method or a computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof.

A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

System Overview

FIG. 1A is a diagram schematically illustrating an example voice communication system where embodiments of the invention can be applied.

As illustrated in FIG. 1A, user A operates a communication terminal 101, and user B operates a communication terminal 102. In a voice communication session, user A and user B talk to each other through their communication terminals 101 and 102. The communication terminals 101 and 102 are coupled through a data link 103. The data link 103 may be implemented as a point-to-point connection or a communication network. At either side of user A and user B, VAD is performed on audio blocks of the audio signal captured by the user's communication terminal. If voice presence is decided in an audio block, corresponding processing (e.g., applying a gain suitable for voice) is performed on the audio block and the audio block is transmitted to another user's communication terminal 101 through the data link 103. If no voice presence is decided in an audio block, corresponding processing (e.g., applying a gain suitable for non-voice) is performed on the audio block and the audio block is transmitted to another user's communication terminal 101 through the data link 103. In this case, it is also possible to transmit simple information indicating a silence period to the other user's communication terminal, or to indicate that the time period corresponding to this audio block is silent by transmitting nothing. The other user's communication terminal receives the transmitted audio blocks and stores them to entries corresponding to the same time as the audio blocks in its jitter buffer, to eliminate transmission jitters. Audio blocks in the jitter buffer are fed through decoding and processing to reproduce them at the output transducer or transducers of the communication terminal. Reception of the simple information or nothing may cause corresponding empty entries in the jitter buffer.

Figure 1B:
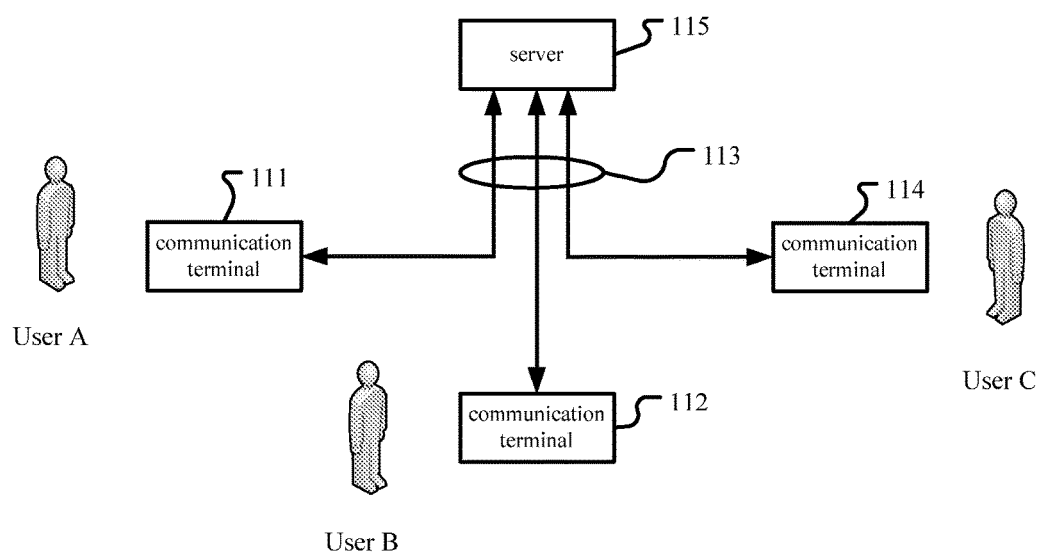
FIG. 1B is a diagram schematically illustrating another example voice communication system where embodiments of the invention can be applied.

FIG. 1B is a diagram schematically illustrating another example voice communication system where embodiments of the invention can be applied. In this example, a voice conference may be conducted among users.

As illustrated in FIG. 1B, user A operates a communication terminal 111, user B operates a communication terminal 112, and user C operates a communication terminal 114. In a voice conference session, user A, user B and user B talk to each other through their communication terminals 111, 112 and 114. The communication terminals illustrated in FIG. 1B have the same function as those illustrated in FIG. 1A. However, the communication terminals 111, 112 and 114 are coupled to a server 115 through a common data link 113 or separate data links 113. The data link 113 may be implemented as a point-to-point connection or a communication network. At either side of user A, user B and user C, VAD is performed on audio blocks of the audio signal captured by the user's communication terminal. If voice presence is decided in an audio block, corresponding processing (e.g., applying a gain suitable for voice) is performed on the audio block and the audio block is transmitted to the server 115 through the data link 113. If no voice presence is decided in an audio block, corresponding processing (e.g., applying a gain suitable for non-voice) is performed on the audio block and the audio block is transmitted to the server 115 through the data link 113. In this case, it is also possible to transmit simple information indicating a silence period to the server 115, or to indicate that the time period corresponding to this audio block is silent by transmitting nothing. The server 115 receives the transmitted audio blocks and stores them to entries corresponding to the same time as the audio blocks in its jitter buffers associated with the users respectively, to eliminate transmission jitters. Audio blocks corresponding to the same time in the jitter buffers are mixed into one audio block and the mixed audio block is transmitted to all users A, B and C. Reception of the simple information or nothing may cause corresponding empty entries in the jitter buffers. The users' communication terminals receive the audio blocks from the server 115 and store them to entries corresponding to the same time as the audio blocks in their jitter buffers, to eliminate transmission jitters. In each communication terminal, audio blocks in the jitter buffer are fed to a voice processor to reproduce them through the speaker system of the communication terminal. Although three communication terminals are illustrated in FIG. 1B, there can reasonably be two or more communication terminals coupled in the system.

Transmitting Side

Figure 2:
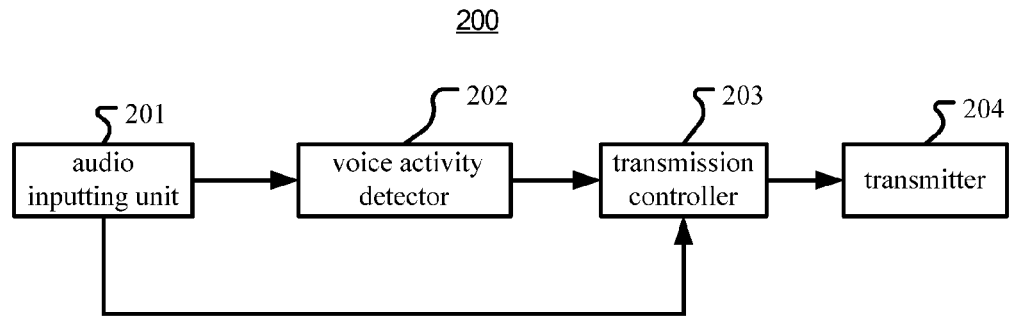
FIG. 2 is a block diagram illustrating an example apparatus for performing voice communication based on VAD according to an embodiment of the invention.

FIG. 2 is a block diagram illustrating an example apparatus 200 for performing voice communication based on VAD according to an embodiment of the invention. The apparatus 200 may be used as the communication terminals illustrated in FIG. 1A and FIG. 1B.

As illustrated in FIG. 2, the apparatus 200 includes an audio inputting unit 201, a voice activity detector 202, a transmission controller 203 and a transmitter 204.

The audio inputting unit 201 is configured to acquire audio blocks in sequence. Each audio block in the sequence includes one or more audio frames, and will typically have the same length. The audio blocks may be captured by the audio inputting unit 201, or may be received by the audio inputting unit 201 from a device for capturing the audio blocks.

The voice activity detector 202 is configured to perform VAD on the audio blocks acquired by the audio inputting unit 201. Various VAD methods may be adopted. As a result of VAD, events such as voice onset, voice continuation or non-voice may be decided for the audio blocks and any associated logic.

In the VAD methods, any decision about the events must be made in a finite time, and there is a balance between the extent that the decision is correct, and the time taken to make the decision. Introducing latency at the stage of audio preprocessing and decision to send will increase the accuracy, however it is undesirable for system performance. In general, there is a delay from the audio block where an actual voice onset presents to the audio block where a voice onset is decided. Based on this observation, upon deciding a voice onset for one audio block, it is possible to go back a few audio blocks to at least include the audio block where the actual voice onset presents in the decided voice activity. This may achieve a significant increase in voice quality by avoiding the critical error of Front Edge Clipping, or missing the low energy activity at the start of a desired talk burst.

If the voice activity detector 202 decides voice onset for a present audio block in the sequence, in response to this, the transmission controller 203 is configured to retrieve a subsequence of the sequence. The subsequence precedes the present audio block immediately. For example, assuming that the present audio block is an audio block n in the sequence, the subsequence may include audio blocks n–k to n–1. The subsequence has a predetermined length and non-voice is decided for each audio block in the subsequence. For specific applications and the specific VAD method, it is possible to estimate delay from the audio block where an actual voice onset presents to the audio block where a voice onset is decided based on statistics. Accordingly, the predetermined length may be set to a value not shorter than the delay. It is also possible to tune the predetermined length via tests.

It can be understood that, audio blocks with non-voice being decided may be stored for future retrieval upon deciding a voice onset for a following audio block. it is also possible to perform processing suitable to non-voice the present audio block and transmit it to the receiving party. In an example, it is possible to store all the audio blocks permanently or temporarily with non-voice being decided. In another example, it is possible to push the audio blocks with non-voice being decided into a queue of the length not shorter than the predetermined length.

If voice continuation is decided for an audio block, the audio block is transmitted to the receiving party. The processing in this case may be similar to that in conventional voice communication applications based on VAD.

Where a voice onset is decided, the transmitter 204 is configured to transmit the present audio block and the audio blocks in the subsequence to a receiving party. The audio blocks in the subsequence are identified as reprocessed audio blocks, so that the receiving party may know that these audio blocks are different from the present audio block and reprocessed as including voice. The present audio block and the subsequence may be transmitted in one packet, or in separate packets. In the latter case, it may be desirable to assign different priorities to each of the separate packets.

Figure 3A:
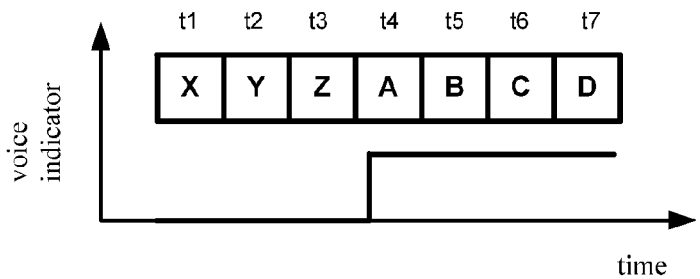
FIG. 3A is a diagram illustrating an example scenario where VAD is performed on an example sequence of audio blocks.

FIG. 3A is a diagram illustrating an example scenario where VAD is performed on an example sequence of audio blocks X, Y, Z, A, B, C and D corresponding to time t1, t2, t3, t4, t5, t6 and t7 respectively. As illustrated in FIG. 3A, non-voice is decided for the audio blocks X, Y and Z. A voice onset is decided for the audio block A, and voice continuation is decided for the audio blocks B, C and D.

Figure 3B:
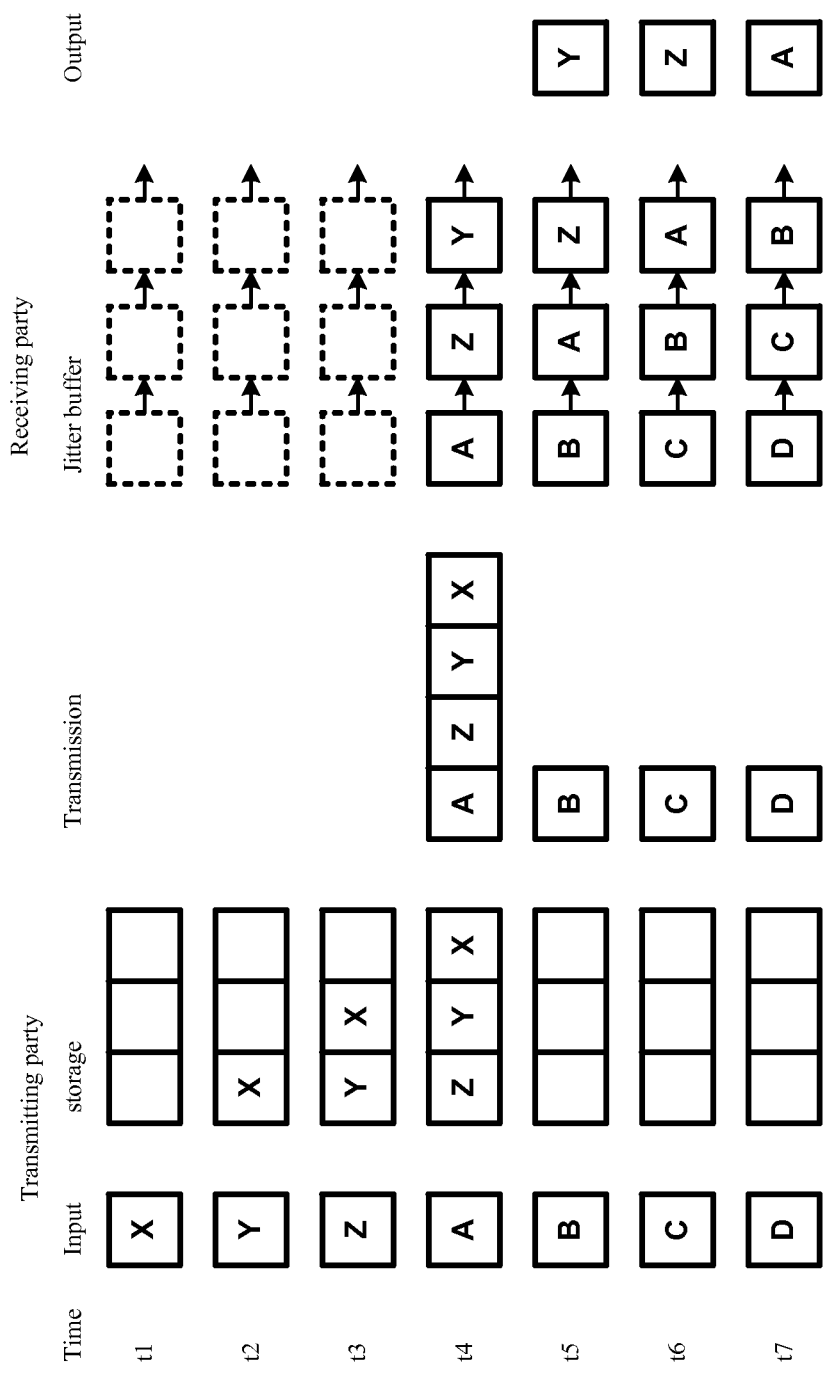
FIG. 3B is a diagram schematically illustrating an example process of audio block transmission between a transmitting party and a receiving party in the scenario illustrated in FIG. 3A.

FIG. 3B is a diagram schematically illustrating an example process of audio block transmission between a transmitting party and a receiving party. Boxes connected by arrowed lines represent a jitter buffer. Dotted boxes represent empty entries in a jitter buffer. Solid boxes with labels represent audio blocks, and especially, solid boxes connected by arrowed lines represent audio blocks in entries of a jitter buffer. The jitter buffer can operate in a first-in first-out manner. The concatenated boxes represent entries in a storage. As illustrated in FIG. 3B, non-voice is decided for the audio blocks X, Y and Z, and the audio blocks X, Y and Z are not transmitted, but stored. Voice onset is decided for the audio block A, and the audio block A and a subsequence of the audio blocks X, Y and Z are transmitted, supposing that the predetermined length is 3 audio blocks. Next, voice continuation is decided for the audio blocks B, C and D, and the audio blocks B, C and D are also transmitted with normal timing and sequence. In the scenario of FIG. 3B, the audio blocks X, Y and Z are not transmitted. However, the audio blocks X, Y and Z may be transmitted and stored.

Figure 4:
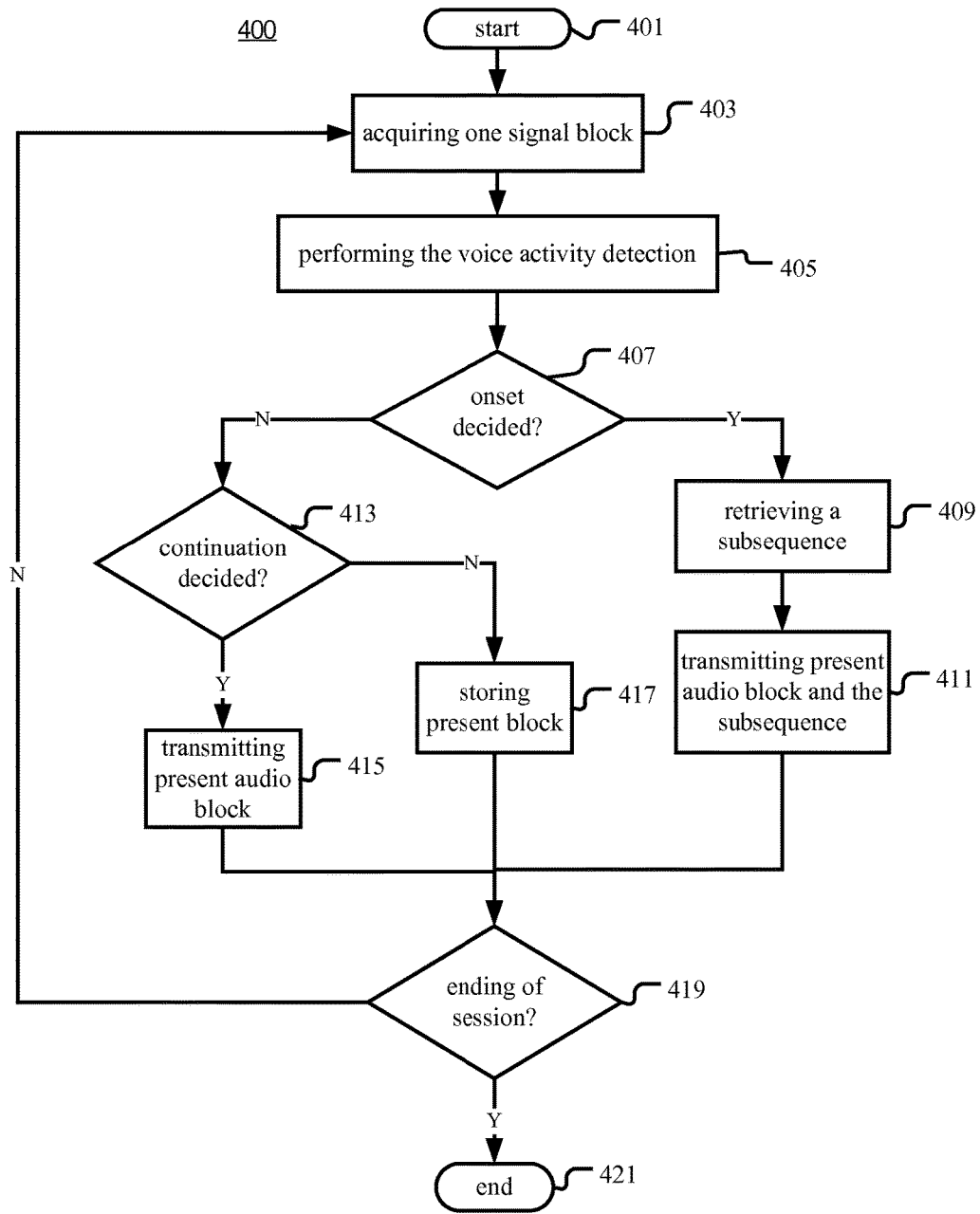
FIG. 4 is a flow chart illustrating an example method of performing voice communication based on VAD according to an embodiment of the invention.

FIG. 4 is a flow chart illustrating an example method 400 of performing voice communication based on VAD according to an embodiment of the invention.

As illustrated in FIG. 4, the method 400 starts from step 401. At step 403, audio blocks are acquired in sequence. Each audio block in the sequence includes one or more audio frames, and will typically have the same length.

At step 405, VAD is performed on a present one of the audio blocks acquired at step 403. Various VAD methods may be adopted. As a result of VAD, events such as voice onset, voice continuation or non-voice may be decided for the audio blocks.

At step 407, it is determined whether voice onset is decided for the present audio block. If it is determined that the voice onset is decided, in response to this, at step 409, a subsequence of the sequence is retrieved. The subsequence precedes the present audio block immediately. The subsequence has a predetermined length and non-voice has been decided for each audio block in the subsequence.

At step 409, the present audio block and the audio blocks in the subsequence are transmitted to a receiving party. The audio blocks in the subsequence are identified as reprocessed audio blocks, so that the receiving party may know that these audio blocks are different from the present audio block and reprocessed as including voice. The present audio block and the subsequence may be transmitted in one packet, or in separate packets. In the latter case, it is preferable to transmit the audio blocks corresponding earlier times in preference.

If it is determined that the voice onset is not decided, at step 413, it is determined whether voice continuation is decided for the present audio block. If it is determined that the voice continuation is decided, at step 415, the present audio block is transmitted to the receiving party. The processing in this case may be similar to that in conventional voice communication applications based on VAD.

If it is determined that the voice continuation is not decided, that is, non-voice is decided, at step 417, the present audio block may be stored for future retrieval upon deciding a voice onset for a following audio block. Alternatively, it is also possible to perform processing suitable to non-voice the present audio block and transmit it to the receiving party. In an example, it is possible to store all the audio blocks with non-voice being decided. In another example, it is possible to push the audio blocks with non-voice being decided into a queue of the length not shorter than the predetermined length.

At step 419, it is determined whether the voice communication session is ended. If the session is ended, the method ends at step 421. If otherwise, the method 400 returns to step 403 to process the next audio block.

In a further embodiment of the apparatus 200, the transmission controller 203 may be further configured to, before the transmission through the transmitter 204, reprocess the subsequence by regarding the earliest audio block in the subsequence as voice onset and regarding each following audio block in the subsequence and the present audio block as voice continuation. It can be understood that before VAD is performed on the present audio block, the audio blocks in the subsequence have been determined as non-voice. In general, processing to audio blocks including voice and audio blocks including no voice are different. For example, a corresponding gain has been applied to the audio blocks including no voice to suppress the signal, whereas a corresponding gain has been applied to the audio blocks including voice to enhance the signal. In case of determining that the audio blocks in the subsequence include voice, it is preferable to reprocess the audio blocks as if the earliest audio block is decided as voice onset and the following audio blocks till the present audio blocks are decided as voice continuation. Further, in an example, the reprocessing of the subsequence comprises applying a gain suitable for voice to the audio blocks of the subsequence. In this case, for each audio block which is determined as non-voice through the voice activity detection, the gain is applied to the audio block. Therefore, the stored audio blocks have been reprocessed. If the stored audio blocks are included in the subsequence, some or all the reprocessing may have been completed in advance.

In a further embodiment of the method 400, the method 400 may include a step of reprocessing the subsequence by regarding the earliest audio block in the subsequence as voice onset and regarding each following audio block in the subsequence and the present audio block as voice continuation. This step may be performed at any position before executing step 411. Further, in an example, the reprocessing of the subsequence comprises applying a gain suitable for voice to the audio blocks of the subsequence. In this case, for each audio block which is determined as non-voice at step 413 through the voice activity detection, the gain is applied to the audio block. Therefore, the stored audio blocks have been reprocessed. If the stored audio blocks are included in the subsequence, some or all the reprocessing have been completed in advance.

In further embodiments of the apparatus 200 and the method 400, the reprocessing of the subsequence comprises applying fade-in to a starting part of the subsequence. This can further improve the voice quality.

Receiving Side

Figure 5:
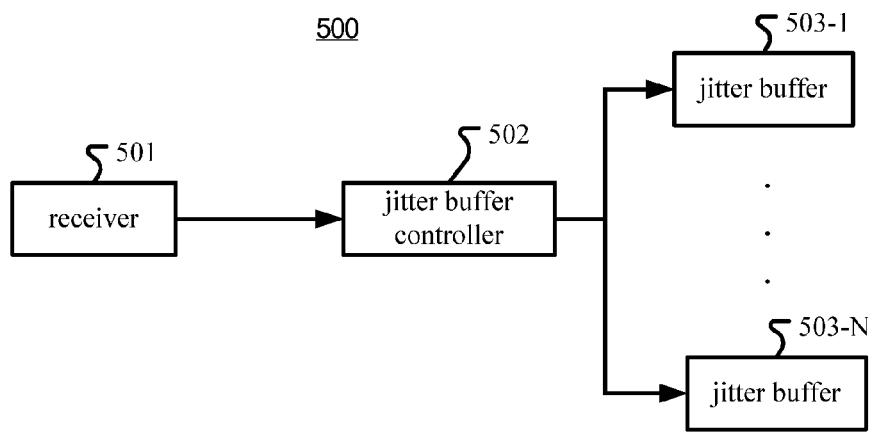
FIG. 5 is a block diagram illustrating an example apparatus for operating one or more jitter buffers in voice communication according to an embodiment of the invention.

FIG. 5 is a block diagram illustrating an example apparatus 500 for operating one or more jitter buffers in voice communication according to an embodiment of the invention. The apparatus 500 may be the communication terminal illustrated in FIG. 1A and FIG. 1B, or the server illustrated in FIG. 1B.

As illustrated in FIG. 5, the apparatus 500 includes a receiver 501, a jitter buffer controller 502 and jitter buffers 503-1 to 503-N.

The receiver 501 is configured receive audio blocks from transmitting parties 1 to N coupled with the apparatus 500. Depending on specific applications, N may be equal to 1 or greater than 1.

Each jitter buffer 503-i may be associated with a transmitting party i, so as to temporarily store audio blocks received from the transmitting party i.

For each of the received audio blocks, if the received audio block is identified as a reprocessed audio block, the jitter buffer controller 502 is configured to determine whether the received audio block is timed out relative to the time range of the jitter buffer associated with the transmitting party of the received audio block. Each jitter buffer may have a time range defined by a start time ST and an end time ET. Entries in the jitter buffer correspond to times within the time range [ST, ET]. As the time elapses, the time range of the jitter buffer is shifted to increase the start time and the end time by an increment $\Delta T \geq 1$, and entries corresponding to times ST to ST+$\Delta T$−1 are moved out from the jitter buffer, and entries corresponding to times ET+1 to ET+$\Delta T$ are pushed into the jitter buffer. If the time represented by the received audio block is earlier than ST, it is determined that the received audio block is timed out.

If it is determined that the received audio block is not timed out, that is, within the time range [ST, ET], the jitter buffer controller 502 is configured to update an entry corresponding to the same time as the received audio block in the jitter buffer, with the received audio block. It can be understood that the operation of updating may vary in different scenarios, so that the entry include what should be included under the requirements of the applications. In an scenario (e.g., audio blocks decided as non-voice are not transmitted), if the entry to be updated is empty, the updating may be performed by filing the received audio block into the entry. In another scenario (e.g., audio blocks decided as non-voice are suppressed and transmitted), if the entry to be updated includes an audio block originated from the same source (that is, captured by and originated from the same device) as the received audio block, this means that the audio block in the entry is an older version of the received audio block, and the updating may be performed by replacing the audio block in the entry with the received audio block. In another scenario (e.g., audio blocks from different sources are relayed by a server, received at an end user terminal and stored in a common jitter buffer, and audio blocks decided as non-voice are not transmitted), if the entry to be updated includes an audio block originated from a different source from that of the received audio block, the updating may be performed by mixing the audio block in the entry with the received audio block.

If the received audio block is not identified as a reprocessed audio block, this means that the received audio block is the present audio block decided as voice onset or voice continuation, and the corresponding entry in the jitter buffer should be empty. In this case, the jitter buffer controller 502 is configured to fill the received audio block into an entry corresponding to the same time as the received audio block in the jitter buffer associated with the transmitting party.

In the example illustrated in FIG. 3B, before time t4, entries in the jitter buffer of the receiving party, e.g., the apparatus 500, are empty because the audio blocks X, Y and Z are decided as non-voice and are not transmitted. At the stage indicated by time t4, voice onset is decided for the audio block A and the audio blocks A, X, Y and Z are transmitted to the receiving party. The audio blocks A, X, Y and Z are received by the receiver 501 at the receiving party. The audio blocks X, Y and Z are identified as reprocessed audio blocks. The audio block A is not identified as reprocessed audio block. The audio blocks A, Y and Z are not timed out relative to the time range of the jitter buffer, and the audio block X is timed out. In this case, the jitter buffer controller 502 fills the audio blocks A, Y and Z into corresponding entries. In this example, the receiving party is an end user terminal, so the timed out audio block X is discarded. In this case, it is preferable to obtain the audio blocks through Modified Discrete Cosine Transform (MDCT) or similar overlapped transform because there is little perceptual penalty for dropping such a block.

If the receiving party is a server, the processing to the timed out audio block X may be different and will be described in detail in the following sections.

Figure 6:
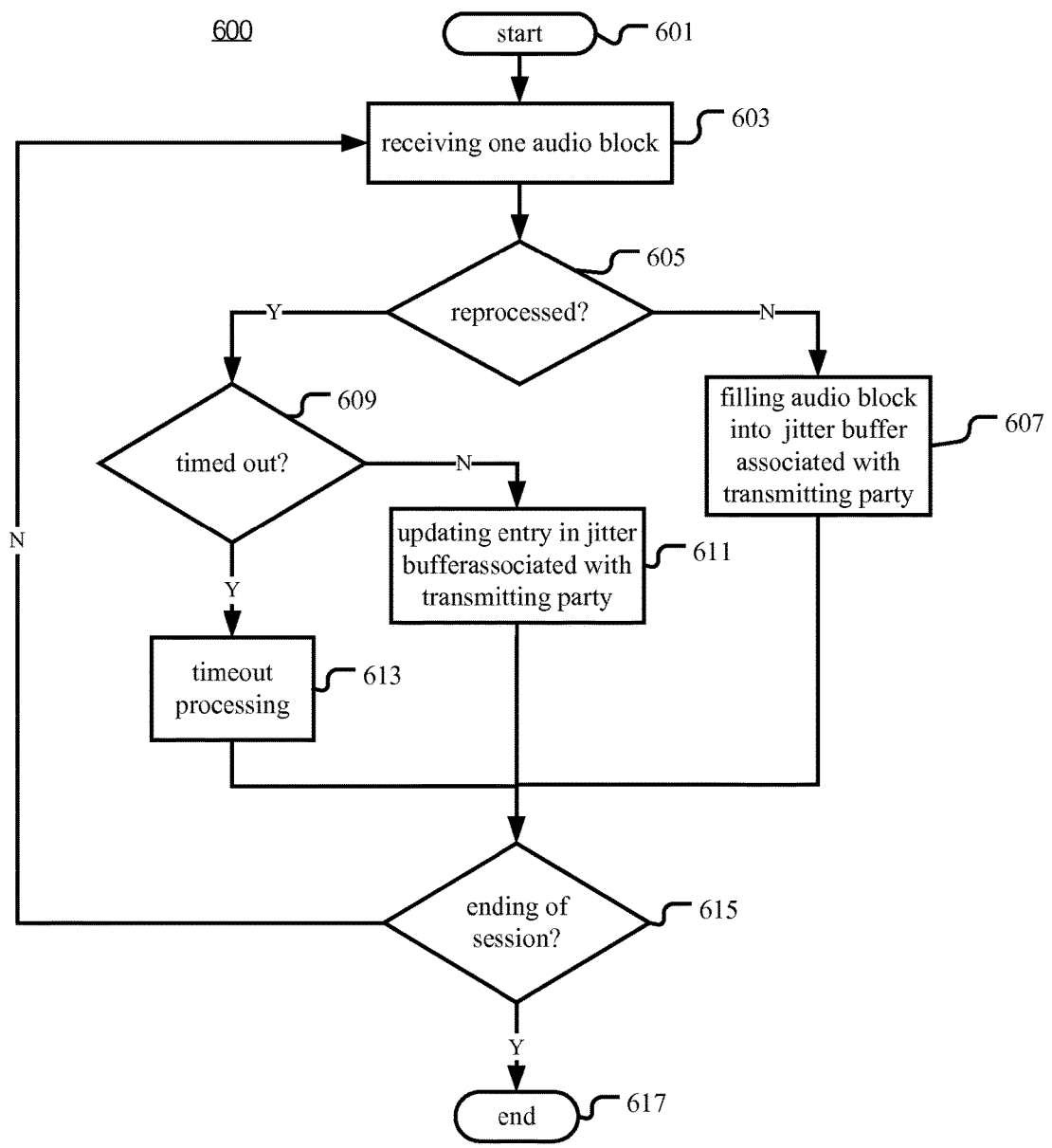
FIG. 6 is a flow chart illustrating an example method of operating one or more jitter buffers in voice communication according to an embodiment of the invention.

FIG. 6 is a flow chart illustrating an example method 600 of operating one or more jitter buffers in voice communication according to an embodiment of the invention.

As illustrated in FIG. 6, the method 600 starts from step 601. At step 603, an audio block is received from one of transmitting parties 1 to N. Depending on specific applications, N may be equal to 1 or greater than 1. For each transmitting party i, a jitter buffer 503-i may be associated with the transmitting party i, so as to temporarily store audio blocks received from the transmitting party i.

At step 605, for the received audio blocks, it is determined if the received audio block is identified as a reprocessed audio block. If it is determined that the received audio block is identified as a reprocessed audio block, at step 609, it is determined whether the received audio block is timed out relative to the time range of the jitter buffer associated with the transmitting party of the received audio block. If it is determined that the received audio block is not timed out, at step 611, an entry corresponding to the same time as the received audio block in the jitter buffer is updated with the received audio block. If it is determined at step 609 that the received audio block is timed out, at step 613, timeout processing may be performed on the received audio block in a similar manner to that in conventional methods.

If it is determined at step 605 that the received audio block is not identified as a reprocessed audio block, at step 607, the received audio block is filled into an entry corresponding to the same time as the received audio block in the jitter buffer associated with the transmitting party.

At step 615, it is determined whether the voice communication session is ended. If the session is ended, the method ends at step 617. If otherwise, the method 600 returns to step 603 to process the next audio block.

Figure 7:
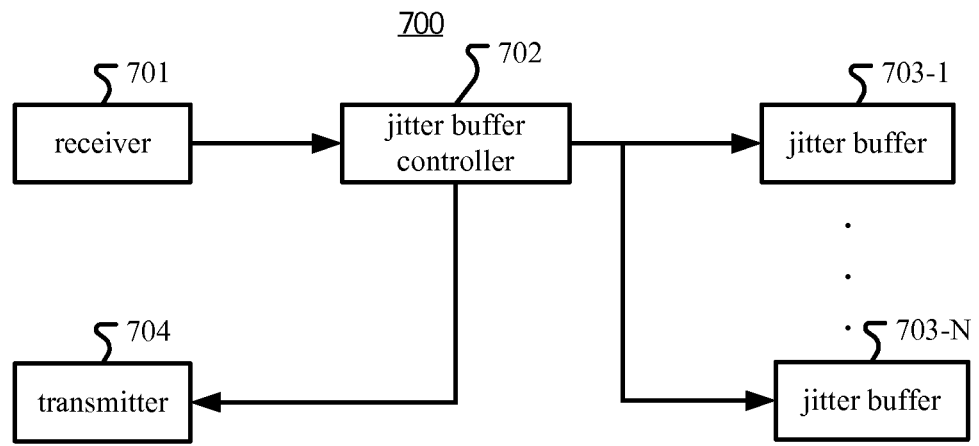
FIG. 7 is a block diagram illustrating an example apparatus for operating one or more jitter buffers in voice communication according to an embodiment of the invention.

FIG. 7 is a block diagram illustrating an example apparatus 700 for operating one or more jitter buffers in voice communication according to an embodiment of the invention. The apparatus 700 may be the server illustrated in FIG. 1B.

As illustrated in FIG. 7, the apparatus 700 includes a receiver 701, a jitter buffer controller 702, jitter buffers 703-1 to 703-N, and a transmitter 704. In this embodiment, N>=1.

The receiver 701 and the jitter buffers 703 have the same function as the receiver 501 and the jitter buffers 503 respectively, and will not be described in detail hereafter.

The jitter buffer controller 702 includes the function of the jitter buffer controller 502. Further, in case that it is determined that the received audio block is timed out, if it is determined that the received audio block corresponds to the same time as the entry moved out from the corresponding jitter buffer but waiting for mixing, the jitter buffer controller 702 is configured to update the entry with the received audio block. As a server, the apparatus 700 receives audio blocks from a plurality of parties and manage the received audio blocks with corresponding jitter buffers associated with the parties respectively. The apparatus also moves out entries from the jitter buffers, mixes the content in the entries and transmits the mixed content to a specific party. If a received audio block is timed out, it may correspond to an entry which is moved out from the jitter buffer, but has not been mixed and transmitted. In this case, it is possible to update the entry with the received audio block, so that the received audio block can be mixed.

If it is determined that the received audio block does not correspond to the same time as the entry moved out from the corresponding jitter buffer but waiting for mixing, the jitter buffer controller 702 is configured to transmit the received audio block to a destination through the transmitter 704. In this case, the time represented by the received audio block is within the time range of the jitter buffer in the destination, and therefore, the received audio block is transmitted to the destination.

Figure 9A:
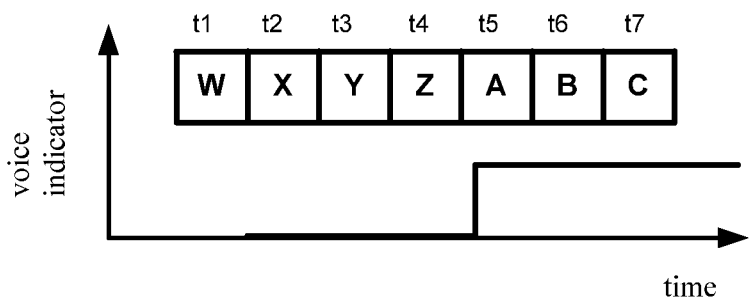
FIG. 9A is a diagram illustrating an example scenario where VAD is performed on an example sequence of audio blocks.

FIG. 9A is a diagram illustrating an example scenario where VAD is performed on an example sequence of audio blocks W, X, Y, Z, A, B and C corresponding to time t1, t2, t3, t4, t5, t6 and t7 respectively. As illustrated in FIG. 9A, non-voice is decided for the audio blocks W, X, Y and Z. Voice onset is decided for the audio block A, and voice continuation is decided for the audio blocks B and C.

Figure 9B:
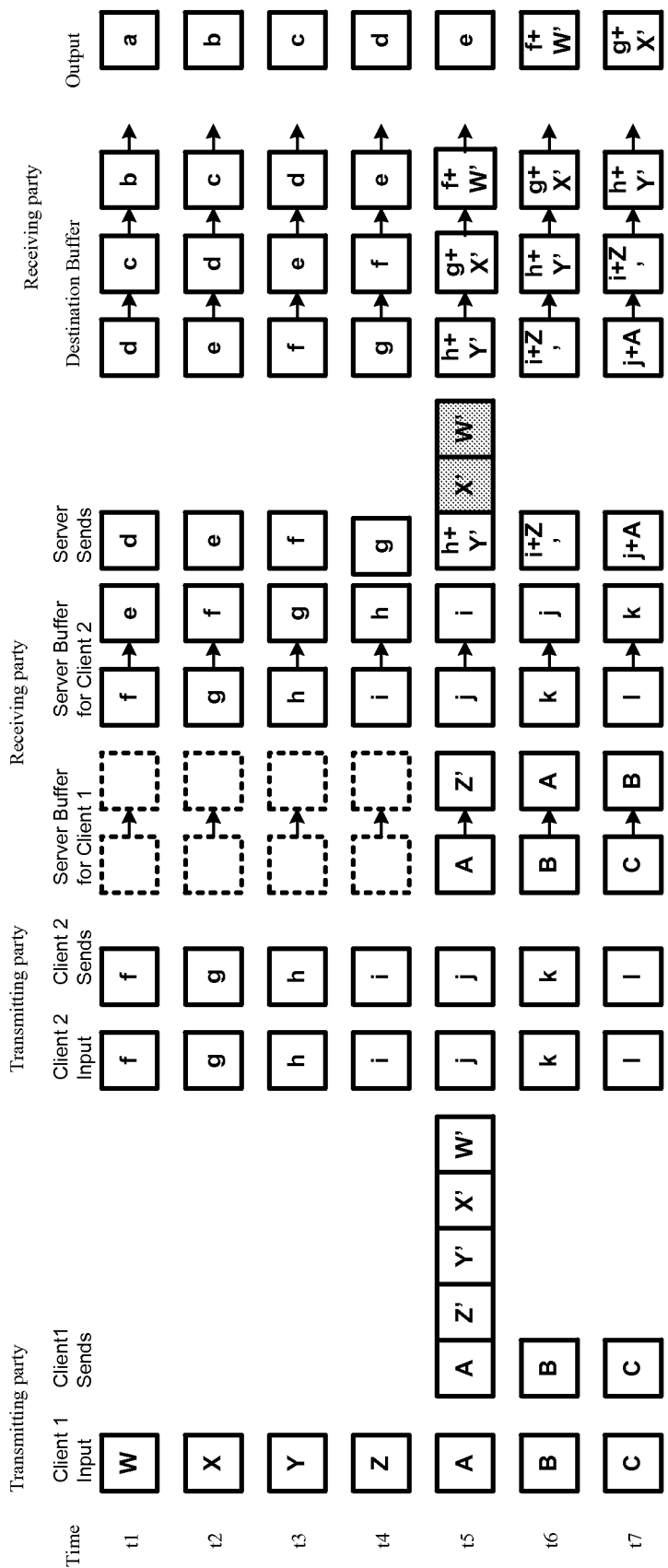
FIG. 9B is a diagram schematically illustrating an example process of audio block transmission among transmitting parties and receiving parties.

FIG. 9B is a diagram schematically illustrating an example process of audio block transmission among two transmitting parties (Client 1 and Client 2), and two receiving parties (a server and a destination). The legends in FIG. 9B are identical to those in FIG. 3B. As illustrated in FIG. 9B, at Client 1, non-voice is decided for the audio blocks W, X, Y and Z, and the audio blocks W, X, Y and Z are not transmitted, but stored. Voice onset is decided for the audio block A, and the audio block A and a subsequence of the audio blocks W', X', Y' and Z' are transmitted, supposing that the predetermined length is 4 audio blocks. The audio blocks W', X', Y' and Z' are reprocessed versions of the audio blocks W, X, Y and Z. Next, voice continuation is decided for the audio blocks B and C, and the audio blocks B and C are also transmitted. At the server, e.g., the apparatus 700, at the stage indicated by time t5, the receiver 701 receives the audio block A, W', X', Y' and Z'. The jitter buffer controller 702 determines that the audio block W', X', Y' and Z' are identified as reprocessed audio blocks, and the audio block W', X' and Y' are timed out relative to the time range of the jitter buffer associated with Client 1. Further, the jitter buffer controller 702 determines that the audio block Y' corresponds to the same time as the entry moved out from the corresponding jitter buffer but waiting for mixing. In this case, the jitter buffer controller 702 update the entry with the audio block Y', and then, the entry including the audio block Y' is mixed with another entry moved out from the jitter buffer associated with Client 2 and corresponding to the same time into one audio block labeled as h+Y'. The jitter buffer controller 702 also determines that the audio blocks X' and W' does not correspond to the same time as the entry moved out from the corresponding jitter buffer but waiting for mixing. In this case, the jitter buffer controller 702 transmit the audio blocks X' and W' to the destination through the transmitter 704.

Figure 8:
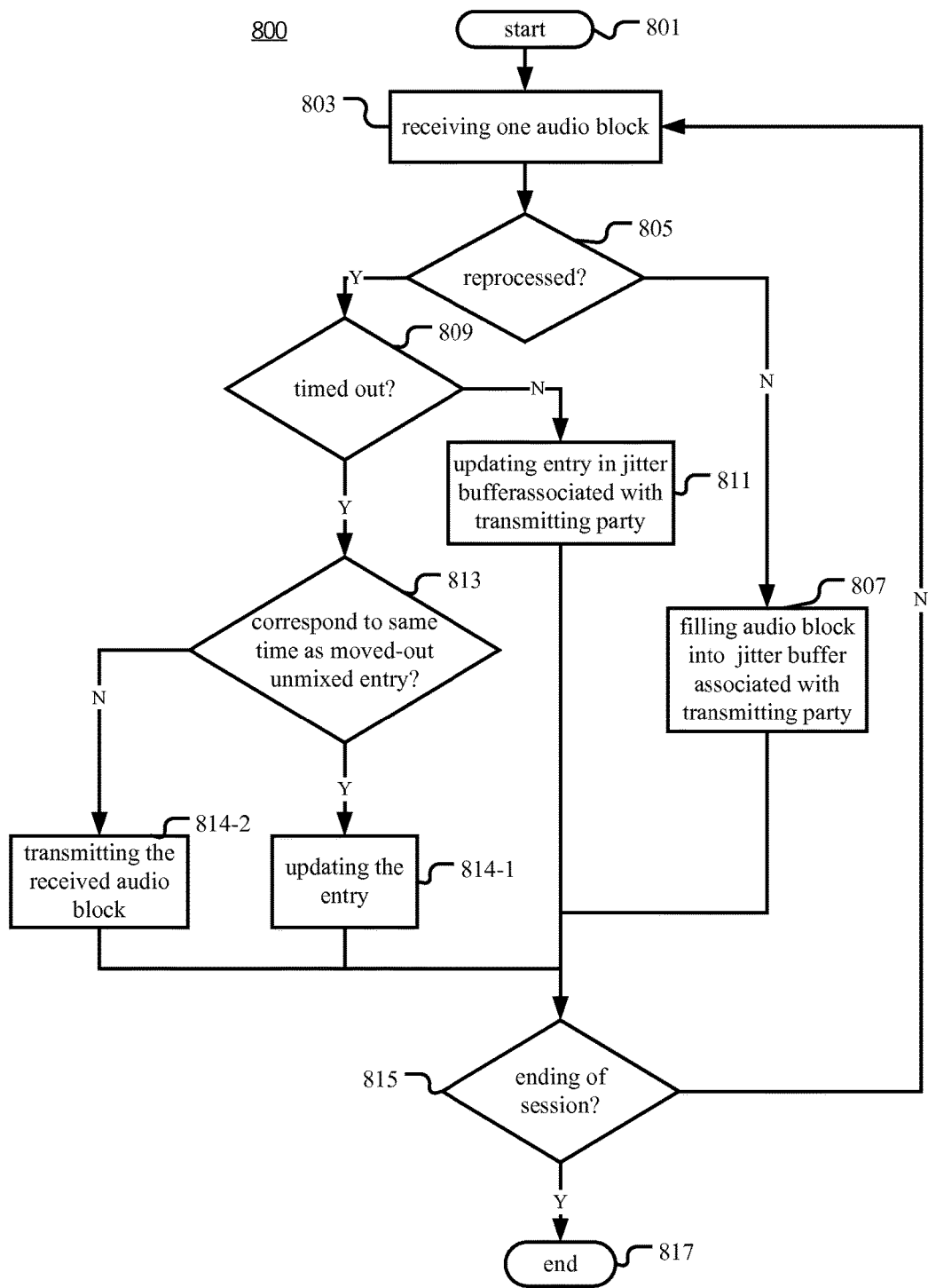
FIG. 8 is a flow chart illustrating an example method of operating one or more jitter buffers in voice communication according to an embodiment of the invention.

FIG. 8 is a flow chart illustrating an example method 800 of operating one or more jitter buffers in voice communication according to an embodiment of the invention.

In the method 800, steps 801, 803, 805, 807, 809, 811, 815 and 817 have the same function as the steps 601, 603, 605, 607, 609, 611, 615 and 617 respectively, and will not be described in detail hereafter.

If it is determined at step 809 that the received audio block is timed out, at step 813, it is determined whether the received audio block corresponds to the same time as the entry moved out from the corresponding jitter buffer but waiting for mixing. If the received audio block corresponds to the same time as the entry moved out from the corresponding jitter buffer but waiting for mixing, at step 814-1, the entry is updated with the received audio block. If the received audio block does not correspond to the same time as the entry moved out from the corresponding jitter buffer but waiting for mixing, at step 814-2, the received audio block is transmitted to a destination. After steps 814-1 and 814-2, the method 800 proceeds to step 815.

In further embodiments of the apparatus 700 and the method 800, the updating of the entry with the received audio block may comprises the following scenarios. In a scenario, the entry includes an audio block, and the included audio block is replaced with the received audio block. In another scenario, the entry is empty, and the received audio block is filled into the entry.

In further embodiments of the apparatus 500 and the method 600, a voice processor is fed with audio blocks in the corresponding jitter buffer. In this case, the updating of the entry with the received audio block may comprise the following scenarios. In a scenario, the entry includes an audio block generated by a source different from that of the received audio block, and the received audio block and the included audio block are mixed into one audio block and the included audio block is replaced with the mixed audio block. In another scenario, the entry includes an audio block generated by the same source as the received audio block, and the included audio block is replaced with the received audio block. In another scenario, the entry is empty, and the received audio block is filled into the entry.

In the example illustrated in FIG. 9B, at the stage indicated by time t5, the receiver at the destination apparatus received the audio blocks h+Y', X' and W'. The jitter buffer controller determines that the audio blocks X' and W' as reprocessed ones, and are not timed out relative to the time range of the jitter buffer. Further, the jitter buffer controller determines that the entries corresponding to the same time as the audio blocks X' and W' include audio blocks g and f generated by a source (Client 2) different from that (Client 1) of the audio blocks X' and W'. In this case, the audio block X' and the audio block g are mixed into one audio block g+X', and the audio block W' and the audio block f are mixed into one audio block f+W'.

The embodiments of the invention provides a technique to take advantage of the jitter buffer at the receiver and subsequent network links to improve the balance of speech intelligibility and false alarms that is inherent in any system making a decision about voice activity for an uncertain acoustical input. The embodiments of the invention is practical, suitable for implementation in actual product, and offers a significant advantage in system performance (network bandwidth, voice quality and/or rate of disturbance in multiparty conference calls).

Figure 10:
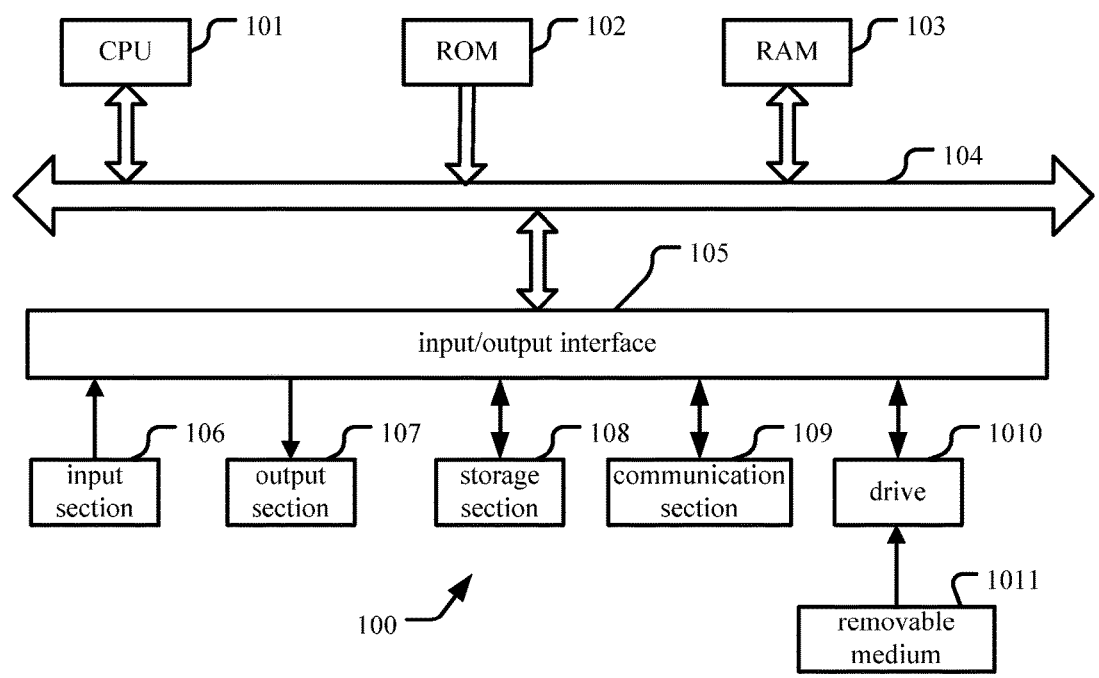
FIG. 10 is a block diagram illustrating an exemplary system for implementing embodiments of the present invention.

In FIG. 10, a central processing unit (CPU) 1001 performs various processes in accordance with a program stored in a read only memory (ROM) 1002 or a program loaded from a storage section 1008 to a random access memory (RAM) 1003. In the RAM 1003, data required when the CPU 1001 performs the various processes or the like are also stored as required.

The CPU 1001, the ROM 1002 and the RAM 1003 are connected to one another via a bus 1004. An input/output interface 1005 is also connected to the bus 1004.

The following components are connected to the input/output interface 1005: an input section 1006 including a keyboard, a mouse, or the like; an output section 1007 including a display such as a cathode ray tube (CRT), a liquid crystal display (LCD), or the like, and a loudspeaker or the like; the storage section 1008 including a hard disk or the like; and a communication section 1009 including a network interface card such as a LAN card, a modem, or the like. The communication section 1009 performs a communication process via the network such as the internet.

A drive 1010 is also connected to the input/output interface 1005 as required. A removable medium 1011, such as a magnetic disk, an optical disk, a magneto-optical disk, a semiconductor memory, or the like, is mounted on the drive 1010 as required, so that a computer program read therefrom is installed into the storage section 1008 as required.

In the case where the above-described steps and processes are implemented by the software, the program that constitutes the software is installed from the network such as the internet or the storage medium such as the removable medium 1011.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The following exemplary embodiments (each an "EE") are described.

EE 1. A method of performing voice communication based on voice activity detection, comprising:
  acquiring audio blocks in sequence, wherein each of the audio blocks includes one or more audio frames;
  performing the voice activity detection on the audio blocks; and
  in response to deciding voice onset for a present one of the audio blocks,
    retrieving a subsequence of the sequence of the acquired audio blocks, which precedes the present audio block immediately, wherein the subsequence has a predetermined length and non-voice is decided for each audio block in the subsequence; and
    transmitting the present audio block and the audio blocks in the subsequence to a receiving party, wherein the audio blocks in the subsequence are identified as reprocessed audio blocks; and
  in response to deciding non-voice for the present audio block, caching the present audio block.

EE 2. The method according to claim 1, wherein before the step of transmitting, the method further comprises:
  reprocessing the subsequence by regarding the earliest audio block in the subsequence as voice onset and regarding each following audio block in the subsequence and the present audio block as voice continuation.

EE 3. The method according to claim 2, wherein the reprocessing of the subsequence comprises applying a gain suitable for voice to the audio blocks of the subsequence.

EE 4. The method according to claim 3, wherein for each audio block which is determined as non-voice through the voice activity detection, the gain is applied to the audio block.

EE 5. The method according to claim 2, wherein the reprocessing of the subsequence comprises applying fade-in to a starting part of the subsequence.

EE 6. The method according to claim 1, wherein the present audio block and the audio blocks in the subsequence are transmitted in one packet.

EE 7. An apparatus for performing voice communication based on voice activity detection, comprising:
  an audio inputting unit configured to acquire audio blocks in sequence, wherein each of the audio blocks includes one or more audio frames;
  a voice activity detector configured to perform the voice activity detection on the audio blocks;
  a transmission controller configured to,
    in response to deciding voice onset for a present one of the audio blocks, retrieve a subsequence of the sequence of the acquired audio blocks, which precedes the present audio block immediately, wherein the subsequence has a predetermined length and non-voice is decided for each audio block in the subsequence; and
    in response to deciding non-voice for the present audio block, caching the present audio block; and
  a transmitter configured to transmit the present audio block and the audio blocks in the subsequence to a receiving party, wherein the audio blocks in the subsequence are identified as reprocessed audio blocks.

EE 8. The apparatus according to claim 7, wherein the transmission controller is further configured to, before the transmission through the transmitter, reprocess the subsequence by regarding the earliest audio block in the subsequence as voice onset and regarding each following audio block in the subsequence and the present audio block as voice continuation.

EE 9. The apparatus according to claim 8, wherein the reprocessing of the subsequence comprises applying a gain suitable for voice to the audio blocks of the subsequence.

EE 10. The apparatus according to claim 9, wherein for each audio block which is determined as non-voice through the voice activity detection, the gain is applied to the audio block.

EE 11. The apparatus according to claim 8, wherein the reprocessing of the subsequence comprises applying fade-in to a starting part of the subsequence.

EE 12. The apparatus according to claim 7, wherein the present audio block and the audio blocks in the subsequence are transmitted in one packet.

EE 13. A method of operating at least one jitter buffer of the same length in voice communication, comprising:
receiving at least one audio block from one or more transmitting parties;
for each of the at least one received audio block,
if the received audio block is identified as a reprocessed audio block,
determining whether the received audio block is timed out relative to a time range of a jitter buffer associated with the transmitting party;
if it is determined that the received audio block is not timed out, updating an entry corresponding to the same time as the received audio block in the jitter buffer, with the received audio block; and
if the received audio block is not identified as a reprocessed audio block, filling the received audio block into an entry corresponding to the same time as the received audio block in the jitter buffer associated with the transmitting party.

EE 14. The method according to claim 13, wherein the one or more transmitting parties comprise at least two transmitting parties, and the method comprises:
if it is determined that the received audio block is timed out,
if it is determined that the received audio block corresponds to the same time as the entry moved out from the corresponding jitter buffer but waiting for mixing, updating the entry with the received audio block; and
if it is determined that the received audio block does not correspond to the same time as the entry moved out from the corresponding jitter buffer but waiting for mixing, transmitting the received audio block to a destination.

EE 15. The method according to claim 14, wherein the updating of the entry with the received audio block comprises:
if the entry includes an audio block, replacing the included audio block with the received audio block; and
if the entry is empty, filling the received audio block into the entry.

EE 16. The method according to claim 13, wherein the updating of the entry with the received audio block comprises:
if the entry includes an audio block generated by a source different from that of the received audio block, mixing the received audio block and the included audio block into one audio block and replacing the included audio block with the mixed audio block;
if the entry includes an audio block generated by the same source as the received audio block, replacing the included audio block with the received audio block; and
if the entry is empty, filling the received audio block into the entry, and
the method further comprises:
feeding a voice processor with audio blocks in the jitter buffer corresponding to the voice processor.

EE 17. An apparatus for use in voice communication, comprising:
at least one jitter buffer of the same length, configured to temporarily storing audio blocks received in the voice communication;
a receiver configured to receive at least one audio block from one or more transmitting parties; and
a jitter buffer controller configured to, for each of the at least one received audio block,
if the received audio block is identified as a reprocessed audio block,
determine whether the received audio block is timed out relative to a time range of a jitter buffer associated with the transmitting party;
if it is determined that the received audio block is not timed out, update an entry corresponding to the same time as the received audio block in the jitter buffer, with the received audio block; and
if the received audio block is not identified as a reprocessed audio block, fill the received audio block into an entry corresponding to the same time as the received audio block in the jitter buffer associated with the transmitting party.

EE 18. The apparatus according to claim 17, wherein the one or more transmitting parties comprise at least two transmitting parties, and the apparatus further comprises:
a transmitter, and
the jitter buffer controller is further configured to, if it is determined that the received audio block is timed out,
if it is determined that the received audio block corresponds to the same time as the entry moved out from the corresponding jitter buffer but waiting for mixing, update the entry with the received audio block; and
if it is determined that the received audio block does not correspond to the same time as the entry moved out from the corresponding jitter buffer but waiting for mixing, transmit the received audio block to a destination through the transmitter.

EE 19. The apparatus according to claim 18, wherein the updating of the entry with the received audio block comprises:
if the entry includes an audio block, replacing the included audio block with the received audio block; and
if the entry is empty, filling the received audio block into the entry.

EE 20. The apparatus according to claim 17, further comprising:
a voice processor fed with audio blocks in the corresponding jitter buffer, and
the updating of the entry with the received audio block comprises:
if the entry includes an audio block generated by a source different from that of the received audio block, mixing the received audio block and the included audio block into one audio block and replacing the included audio block with the mixed audio block;
if the entry includes an audio block generated by the same source as the received audio block, replacing the included audio block with the received audio block; and
if the entry is empty, filling the received audio block into the entry.

EE 21. A computer-readable medium having computer program instructions recorded thereon, when being executed by a processor, the instructions enabling the processor to execute a method of performing voice communication based on voice activity detection, comprising:
acquiring audio blocks in sequence, wherein each of the audio blocks includes one or more audio frames;
performing the voice activity detection on the audio blocks; and
in response to deciding voice onset for a present one of the audio blocks, retrieving a subsequence of the sequence of the acquired audio blocks, which precedes the present audio block immediately, wherein the subsequence has a predetermined length and non-voice is decided for each audio block in the subsequence; and transmitting the present audio block and the audio blocks in the subsequence to a receiving party, wherein the audio blocks in the subsequence are identified as reprocessed audio blocks; and in response to deciding non-voice for the present audio block, caching the present audio block.

EE 22. A computer-readable medium having computer program instructions recorded thereon, when being executed by a processor, the instructions enabling the processor to execute a method of operating at least one jitter buffer of the same length in voice communication, comprising:

receiving at least one audio block from one or more transmitting parties;

for each of the at least one received audio block, if the received audio block is identified as a reprocessed audio block, determining whether the received audio block is timed out relative to a time range of a jitter buffer associated with the transmitting party;

if it is determined that the received audio block is not timed out, updating an entry corresponding to the same time as the received audio block in the jitter buffer, with the received audio block; and if the received audio block is not identified as a reprocessed audio block, filling the received audio block into an entry corresponding to the same time as the received audio block in the jitter buffer associated with the transmitting party.

We claim:

1. A method of performing voice communication based on voice activity detection, comprising:

acquiring audio blocks in sequence, wherein each of the audio blocks includes one or more audio frames;

performing voice activity detection on the audio blocks; and in response to deciding voice onset for a present one of the audio blocks, retrieving a subsequence of the sequence of the acquired audio blocks, including a number of audio blocks which precede the present audio block immediately, wherein the subsequence has a predetermined length and non-voice is decided for each audio block in the subsequence; and transmitting the present audio block and the audio blocks in the subsequence to a receiving party, wherein the audio blocks in the subsequence are identified as reprocessed audio blocks to inform the receiving party that these audio blocks are different from the present audio block and reprocessed as including voice; and in response to deciding non-voice for the present audio block, caching the present audio block, wherein before the step of transmitting, the method further comprises:

reprocessing the subsequence by regarding the earliest audio block in the subsequence as voice onset and regarding each following audio block in the subsequence and the present audio block as voice continuation.

2. The method according to claim 1, wherein the reprocessing of the subsequence comprises applying a gain suitable for voice to the audio blocks of the subsequence.

3. The method according to claim 2, wherein for each audio block which is determined as non-voice through the voice activity detection, the gain is applied to the audio block.

4. The method according to claim 1, wherein the reprocessing of the subsequence comprises applying fade-in to a starting part of the subsequence.

5. The method according to claim 1, wherein the present audio block and the audio blocks in the subsequence are transmitted in one packet.

6. The method according to claim 1, wherein when the present audio block is cached, the present audio block becomes one of a plurality of previously cached audio blocks, wherein the subsequence corresponds to the plurality of previously cached audio blocks.

7. The method according to claim 1, further comprising:
in response to detecting no voice activity, transmitting simple information indicating a silence period.

8. The method according to claim 1, further comprising:
in response to detecting no voice activity, transmitting simple information indicating a silence period,
wherein the present audio block is a voice block, wherein the simple information indicating the silence period is a silence block, and wherein the audio blocks in the subsequence are a non-voice block that is neither the voice block nor the silence block.

9. The method according to claim 1, further comprising:
in response to detecting no voice activity, transmitting simple information indicating a silence period,
wherein the receiving party outputs the reprocessed audio blocks instead of the simple information indicating the silence period prior to outputting the present audio block.

10. The method according to claim 1, wherein the present audio block and the audio blocks in the subsequence are transmitted at a single time, and wherein the receiving party outputs the present audio block and the audio blocks in the subsequence at a plurality of different times.

11. An apparatus for performing voice communication based on voice activity detection, comprising:

a memory; and a processor, wherein the processor executes processing that implements:

an audio inputting unit configured to acquire audio blocks in sequence, wherein each of the audio blocks includes one or more audio frames;

a voice activity detector configured to perform the voice activity detection on the audio blocks;

a transmission controller configured to, in response to deciding voice onset for a present one of the audio blocks, retrieve a subsequence of the sequence of the acquired audio blocks, which precedes the present audio block immediately, wherein the subsequence has a predetermined length and non-voice is decided for each audio block in the subsequence; and in response to deciding non-voice for the present audio block, caching the present audio block; and a transmitter configured to transmit the present audio block and the audio blocks in the subsequence to a receiving party, wherein the audio blocks in the subsequence are identified as reprocessed audio blocks to inform the receiving party that these audio blocks are different from the present audio block and reprocessed as including voice, wherein the transmission controller is further configured to, before the transmission through the transmitter, reprocess the subsequence by regarding the earliest audio block in the subsequence as voice onset and regarding each following audio block in the subsequence and the present audio block as voice continuation.

12. The apparatus according to claim 11, wherein the reprocessing of the subsequence comprises applying a gain suitable for voice to the audio blocks of the subsequence.

13. The apparatus according to claim 12, wherein for each audio block which is determined as non-voice through the voice activity detection, the gain is applied to the audio block.

14. The apparatus according to claim 11, wherein the reprocessing of the subsequence comprises applying fade-in to a starting part of the subsequence.

15. The apparatus according to claim 11, wherein the present audio block and the audio blocks in the subsequence are transmitted in one packet.

16. The apparatus according to claim 11, wherein when the present audio block is cached, the present audio block becomes one of a plurality of previously cached audio blocks, wherein the subsequence corresponds to the plurality of previously cached audio blocks.

17. The apparatus according to claim 11, wherein the transmitter is further configured to, in response to no voice activity having been detected, transmit simple information indicating a silence period, wherein the present audio block is a voice block, wherein the simple information indicating the silence period is a silence block, and wherein the audio blocks in the subsequence are a non-voice block that is neither the voice block nor the silence block.

18. The apparatus according to claim 11, wherein the present audio block and the audio blocks in the subsequence are transmitted at a single time, and wherein the receiving party outputs the present audio block and the audio blocks in the subsequence at a plurality of different times.

* * * * *